W. J. HENRY.
AUTOMOBILE SEMAPHORE.
APPLICATION FILED OCT. 4, 1917.
1,303,312.
Patented May 13, 1919.
2 SHEETS—SHEET 1.
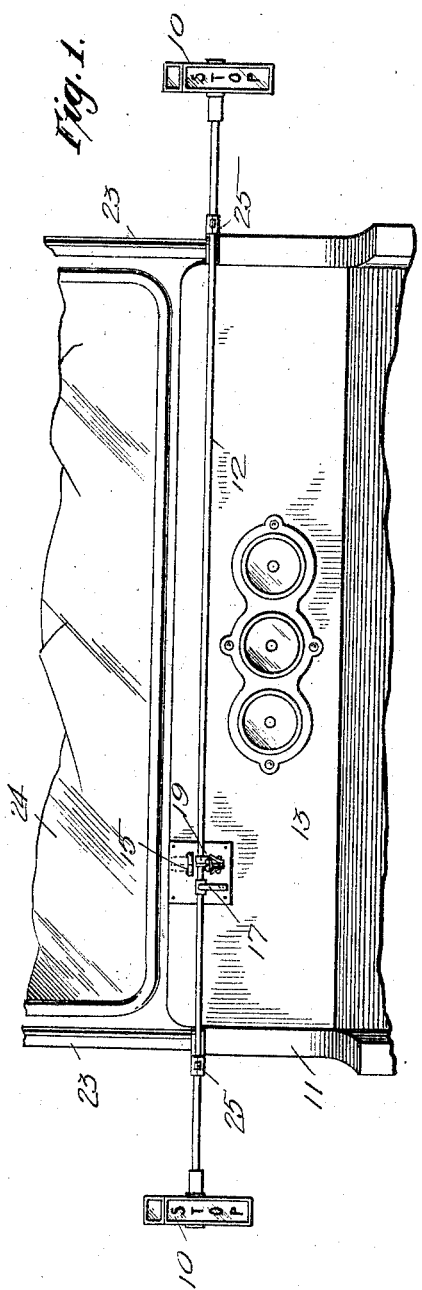
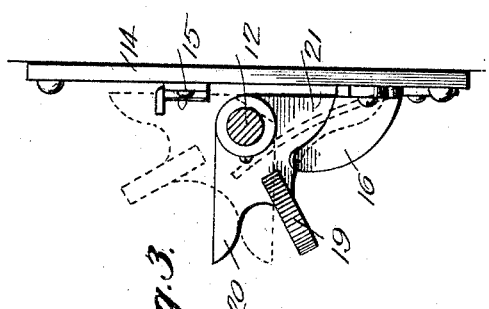
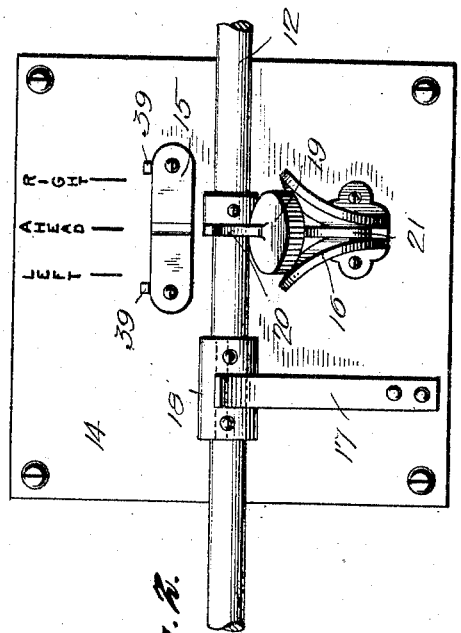
WITNESSES
W. C. Fielding
Myron K. Dear
INVENTOR
William J. Henry
BY
Munn & Co.
ATTORNEYS

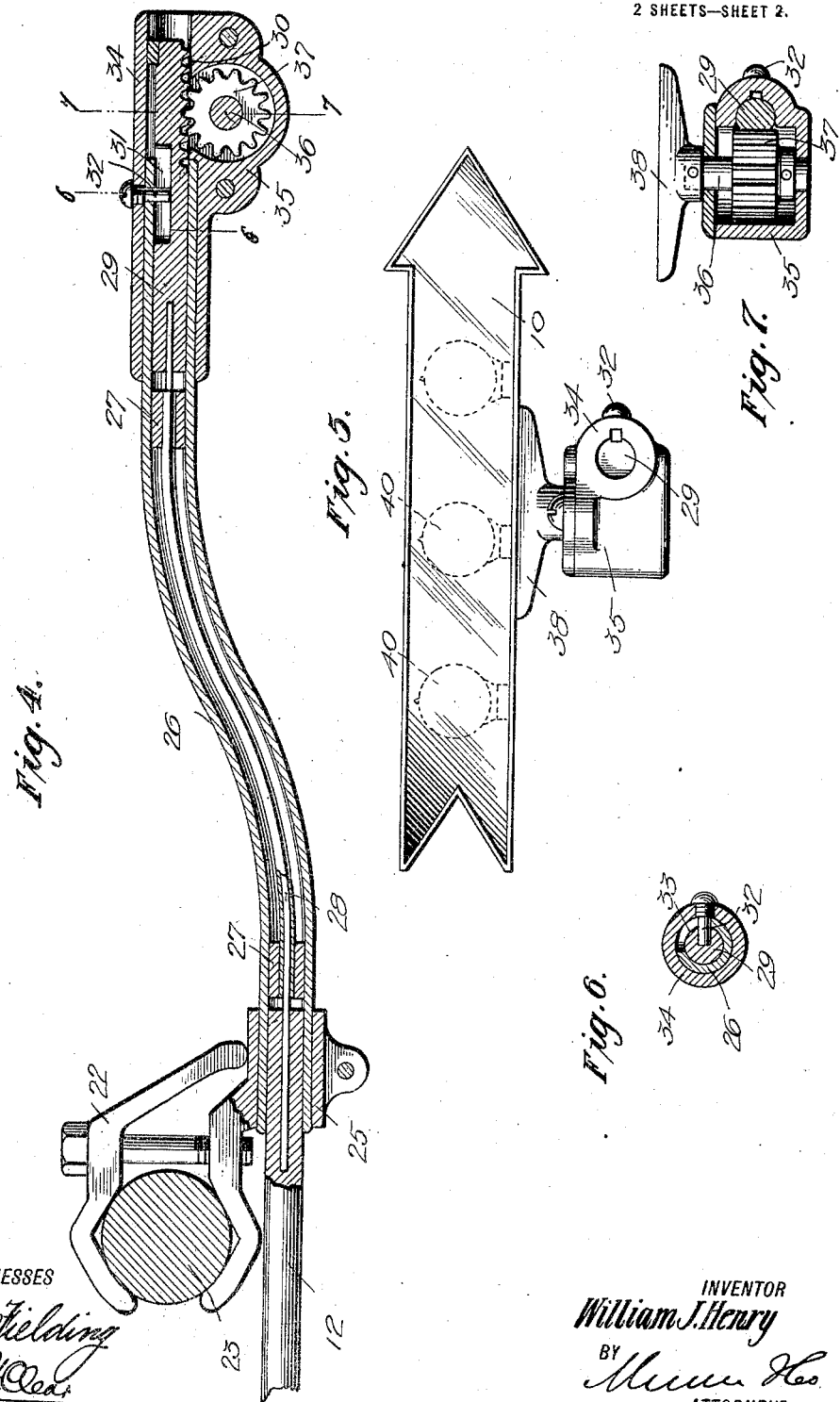

UNITED STATES PATENT OFFICE.

WILLIAM JAMES HENRY, OF AKRON, OHIO.

AUTOMOBILE-SEMAPHORE.

1,303,312.   Specification of Letters Patent.   Patented May 13, 1919.

Application filed October 4, 1917.   Serial No. 194,732.

*To all whom it may concern:*

Be it known that I, WILLIAM J. HENRY, a citizen of the United States, and a resident of Akron, in the county of Summit and State of Ohio, have made certain new and useful Improvements in Automobile-Semaphores, of which the following is a specification.

My present invention relates generally to signals, and more particularly to an automobile signal in the nature of a semaphore, whereby to warn adjacent vehicles and pedestrians of the driver's purpose to either stop or turn to the right or left, or go straight ahead.

A further object is to provide a semaphore of this nature, the movements of which may be effectively and readily controlled from a single point to operate signal members arranged at opposite sides of an automobile with parts whereby to effect such control mechanically, irrespective, of course, of the means employed for lighting the signal members whereby they may be visible in the dark.

With these and other objects relating for the most part to the details of construction of my improvements, my invention resides in the features of construction, arrangement and operation to be presently described with respect to the accompanying drawing forming a part of this specification, and wherein, Figure 1 is a sectional elevation illustrating the dash or instrument board of a vehicle provided with my improvements;

Fig. 2 is an enlarged elevation of a portion of my improvements adjacent a control point;

Fig. 3 is a side elevation of part shown in Fig. 2;

Fig. 4 is a horizontal sectional view through one side portion;

Fig. 5 is an end view, and,

Figs. 6 and 7 are detailed sections taken substantially on line 6—6 and 7—7 of Fig. 4.

Referring now to these figures, my invention contemplates the provision of a pair of signal members 10 for disposition beyond opposite sides of a vehicle generally seen at 11 in Fig. 1, and operated through certain connections in a simultaneous manner from a control shaft 12, which latter is extended transversely of the vehicle along one face of the dash or instrument board 13 thereof.

As seen best in Figs. 1, 2 and 3, a plate 14 is secured to the dash or instrument board 13 at some suitable point therealong in the length of the control shaft 12 and immediately adjacent the latter, said plate 14 having a bracket 15 thereon above the shaft 12, and a V-shaped guide member 16 below the shaft, as well as a spring 17, the free end of which engages a collar 18 secured to the control shaft, in order to frictionally hold the latter in adjusted position.

Adjacent the plate 14 the shaft 12 has a finger piece 19 with upper and lower wings 20 and 21, the former of which is adapted for engagement with the bracket 15 when the finger piece 19 is raised, and the latter being engageable with the guide member 16 when the finger piece 19 is lowered, it being understood that substantially a quarter turn is given the shaft 12 when the finger piece 19 is either raised or lowered.

To this end the attaching members supporting the shaft 12 in position, one of which may be plainly seen in Fig. 4, are in the form of clamps 22, engageable with the uprights 23 of the wind shield 24, and having bearings 25 through which the inner ends of rigid tubes are clamped, through which the outer portions of the shaft 12 are telescopically rotatable.

In case it is necessary to curve the projecting outer ends of the semaphore, as seen in Fig. 4, in order to provide better clearance for ingress and egress to and from the front seat of the vehicle, a curved rigid tube 26 is employed at each side, with its inner end secured in the bearings 25 and receiving the adjacent end of the shaft 12 in telescoping rotatable relation, and provided with internal bushings 27 adjacent its opposite ends forming guides for a connecting rod 28 extending from the adjacent end of the shaft 12 to one end of an actuating piece 29 in the outer end of the tube 26, the ends of the rod 28 being rigidly connected so as to communicate both rotary and longitudinal movement from the shaft 12 to the adjusting piece 29. The adjusting piece 29 has a rack face 30 as best seen in Fig. 4, and is provided with a lengthwise slot 31, the latter receiving the inner end of a pin 32 extending inwardly through a circumferential slot 33 of the tube 26, the outer portion of the said pin 32 being threaded or otherwise secured through the wall of a tubular casing 34 into which the outer end of the tube 26 and the said adjusting member 29 extend. At one side the casing 34 has an enlargement 35 provided with bearings for a post 36, as seen in Figs. 4 and 7, provided within the enlargement 35 with a gear wheel 37 in engagement with the rack 30, the post 36 having a signal bracket 38, at one projecting end to which the respective signal member 10 is secured.

Thus, upon longitudinal movement of the shaft 12, each of the signal members 10 is shifted by virtue of rotation of its post 36 through the actuation or rack 30 in engagement with the gear 37, the adjusting member 29 being shiftable longitudinally by virtue of its slot 31 in which the pin 32 works. Similarly, when the shaft 12 is given a quarter turn by either raising or lowering the finger piece 19, the casing 34 is similarly rotated a quarter turn by virtue of the pin 32 engaged at its inner end by the adjusting member 29, and shiftable in the circumferential slot 33 of the tube 26, seen in Fig. 6.

Referring again to Figs. 1, 2, 3, it will be noted that the shaft 12 is shiftable longitudinally with the finger piece 19 in its upper position only, the upper wing 20 working between upright stops 39 of the bracket 15, which limit the longitudinal movement of the shaft to the right and left, it being obvious by an inspection of these figures that each downward movement of the finger piece 19 serves to return the control shaft to intermediate position by virtue of the engagement of the lower wing 21 of the finger piece in the V-shaped guide 16.

Thus, with the finger piece 19 in the raised position in Fig. 2, shown by dotted line in Fig. 3, each of the signal members 10 is in horizontal position parallel to the line of movement of the vehicle, as seen in Fig. 5, shifting of the finger piece to the right or left from this position resulting in rotation of the signal posts 36 to rotate the signal members 10 into horizontal position at right angles to the line of travel of the vehicle to indicate a turn to the right or left as the case may be.

When the finger piece 19 is shifted to lowermost position, as shown in full lines in Figs. 2 and 3, as well as in Fig. 1, the shaft is given a quarter turn, which results in a quarter turn of each of the casings 34, and consequent movement of the two signal members 10 therewith to vertical positions, as seen in the figure last mentioned.

For the above purposes the signal members 10 may be formed in various ways, it being desirable, however, that they be hollow, or rectangular in cross section, and generally of the arrow shape, as seen in Fig. 5, with transparent or translucent sides, and with internal lighting members 40, together with the word "Stop" upon their upper faces, so that when turned to the vertical position, such positions will plainly indicate to adjacent drivers that a stop is to be made.

I claim:

1. An automobile semaphore comprising a pair of signal members, a controlling shaft operatively connected to said signal members and shiftable longitudinally and rotatable to cause similar movement of the signal members, said shaft having a finger piece provided with a pair of extending wings, a bracket secured at one side of the shaft and having stop members between which one of the said wings is shiftable in the movement of the shaft longitudinally, and a guide member at the opposite side of the shaft to receive the other of said wings when the shaft is rotated and arranged to hold the shaft against longitudinal movement.

2. An automobile semaphore comprising a pair of signal members, a controlling shaft operatively connected to said signal members and shiftable longitudinally and rotatable to cause similar movement of the signal members, said shaft having a finger piece provided with a pair of extending wings, a bracket secured at one side of the shaft and having stop members between which one of the said wings is shiftable in the movement of the shaft longitudinally, a guide member at the opposite side of the shaft to receive the other of said wings when the shaft is rotated and arranged to hold the shaft against longitudinal movement, said guide member being V-shaped and so related to the bracket as to shift the shaft longitudinally to a position centrally between the said stops.

3. An automobile semaphore comprising a rotatable and longitudinally shiftable controlling shaft, a pair of controlling members operatively connected to the ends of said shaft and each provided with a longitudinal slot, and a rack face, a rigid guide tube in which each of the actuating members is rotatably and longitudinally shiftable provided with a circumferential slot, a casing having a tubular portion receiving the said actuating member and the slotted end of the guide tube, and provided with a pin extending inwardly therefrom through the circumferential slot of the tube and into the slot of the actuating member, said casing having a side enlargement, a post journaled through the enlargement and provided therein with a gear wheel in engagement with the rack face of the actuating member, and a signal member secured to the external portion of the post and rotatable with the latter and shiftable with the same and the casing.

WILLIAM JAMES HENRY.